(12) United States Patent
Brix

(10) Patent No.: US 8,629,072 B2
(45) Date of Patent: Jan. 14, 2014

(54) BORON-FREE GLASS

(75) Inventor: Peter Brix, Mainz (DE)

(73) Assignee: Schott AG, Mainz (DE)

( * ) Notice: Subject to any disclaimer, the term of this patent is extended or adjusted under 35 U.S.C. 154(b) by 165 days.

(21) Appl. No.: 12/911,382

(22) Filed: Oct. 25, 2010

(65) Prior Publication Data

US 2011/0098172 A1    Apr. 28, 2011

(30) Foreign Application Priority Data

Oct. 28, 2009 (DE) .................. 10 2009 051 852

(51) Int. Cl.
*C03C 3/087* (2006.01)

(52) U.S. Cl.
USPC .......................................... 501/70

(58) Field of Classification Search
USPC .......................................... 501/70
See application file for complete search history.

(56) References Cited

U.S. PATENT DOCUMENTS

| | | | |
|---|---|---|---|
| 4,403,043 A * | 9/1983 | Nakagaqa et al. | 501/70 |
| 5,221,645 A | 6/1993 | Drouot et al. | |
| 5,508,237 A | 4/1996 | Moffatt et al. | |
| 5,902,665 A * | 5/1999 | Kuroda | 428/846.9 |
| 6,087,282 A * | 7/2000 | Panzera et al. | 501/21 |
| 6,277,777 B1 | 8/2001 | Xu et al. | |
| 6,313,052 B1 * | 11/2001 | Nakashima et al. | 501/69 |
| 6,335,300 B1 * | 1/2002 | Bordeaux et al. | 501/72 |
| 7,153,798 B2 * | 12/2006 | Bordeaux et al. | 501/69 |
| 7,273,668 B2 * | 9/2007 | Kurachi et al. | 428/846.9 |
| 2005/0026767 A1 | 2/2005 | Takase et al. | |
| 2005/0250639 A1 | 11/2005 | Siebers et al. | |
| 2009/0103040 A1 | 4/2009 | Shimizu et al. | |
| 2011/0236684 A1 | 9/2011 | Teschner et al. | |

FOREIGN PATENT DOCUMENTS

| | | |
|---|---|---|
| CA | 2 704 911 | 2/2009 |
| DE | 10 2004 036 523 A1 | 3/2005 |
| DE | 10 2007 036 774 A1 | 2/2009 |
| EP | 1 074 521 A2 | 2/2001 |
| JP | 3-97640 | 4/1991 |
| JP | 5-163034 | 6/1993 |
| JP | 11-240733 | 9/1999 |
| JP | 2005-320234 | 11/2005 |
| JP | 2010-535145 | 11/2010 |
| RU | 631471 | 11/1978 |
| WO | WO 96/39362 | 12/1996 |
| WO | WO 2008/143999 A1 | 11/2008 |

OTHER PUBLICATIONS

S.N. Salama et al., Thermal Conductivity Of Some Silicate Glasses and Their Respective Crystalline Products, 1987, pp. 203-214.
W. Zdaniewski, DTA and X-Ray Analysis Study of Nucleation and Crystallization of $MgO-Al_2O_{3-SiO_2}$ Glasses Containing $ZrO_2$, $TiO_2$, and $CeO_2$, May-Jun. 1975, pp. 163-169.
Taiwan IPO Search Report for Patent Application No. 099135448; Jul. 2013; 1 page.

* cited by examiner

*Primary Examiner* — Karl Group
*Assistant Examiner* — Elizabeth A Bolden
(74) *Attorney, Agent, or Firm* — Harness, Dickey & Pierce, P.L.C.

(57) ABSTRACT

The invention discloses boron-free neutral glasses having the composition (in % by weight, based on oxide) 65-72 $SiO_2$, 11-17 $Al_2O_3$, 0.1-8 $Na_2O$, 3-8 MgO, 4-12 CaO and 0-10 ZnO, a ratio CaO/MgO of 1.4 to 1.6, and having a hydrolytic resistance in accordance with DIN ISO 719 in class 1 and an acid resistance in accordance with DIN 12116 and an alkali resistance in accordance with DIN ISO 695 at least in class 2.

17 Claims, No Drawings

BORON-FREE GLASS

BACKGROUND OF THE INVENTION

The invention relates to a boron-free glass, preferably a neutral glass, which can be melted without the addition of boron-containing raw materials.

The term "neutral glass" is understood to mean glasses with very good hydrolytic resistance and very good acid resistance. Since these glasses thus have a "neutral" action, in that they scarcely impart glass constituents to the solutions, they can be used inter alia as primary packaging material in the pharmaceutical industry, in particular for injection solutions.

Table 1 summarizes the classifications of glasses with respect to the chemical resistance to water, acids and alkalis in accordance with the various standards.

TABLE 1

| | Resistance to . . . | | |
|---|---|---|---|
| | Water (H) | Acid (S) | Alkali (L) |
| Standard | DIN ISO 719 | DIN 12116 | DIN ISO 695 |
| Solution | Dist. H$_2$O | 6n HCl (semi-conc.) | 0.5m Na$_2$CO$_3$ + 0.5m NaOH |
| Temperature | 98° C. | 108° C. | 102° C. |
| Duration | 1 hr | 6 hrs | 3 hrs |
| Unit | μg Na$_2$O/g glass | mg/dm$^2$ | mg/dm$^2$ |
| Class 1 | up to 31 | up to 0.7 | up to 75 |
| Class 2 | up to 62 | up to 1.5 | up to 175 |
| Class 3 | up to 264 | up to 15 | more than 175 |
| Class 4 | up to 620 | more than 15 | |
| Class 5 | more than 620 | | |

The known commercially available neutral glasses, e.g. SCHOTT FIOLAX® 8412 and 8414 or SCHOTT DURAN® 8330 from Schott AG, Mainz, are classified in the group of borosilicate glasses, since they contain, more than 8% B$_2$O$_3$. These are glasses in hydrolytic class 1 and acid class 1 and in alkali class 2, referred to here for short as "1-1-2 glass".

Although the boron oxide is present in SCHOTT FIOLAX® 8412 only in an amount of about 11%, the raw material disodium tetraborate pentahydrate amounts to approximately half the total costs for raw materials. The situation regarding raw materials for borosilicate glasses without sodium oxide, e.g. alkali metal-free glasses for LCD displays, is even more unfavorable, because in this case it is necessary to use the much more expensive raw material boron oxide (boric acid), which first has to be obtained by technical means from borax. The costs for the B$_2$O$_3$ glass component from the raw material boron oxide are seven times higher than the costs for B$_2$O$_3$ from the raw material disodium tetraborate pentahydrate.

The EU (European Union) has recently classified boric acid, diboron trioxide, disodium tetraborate anhydrite, disodium tetraborate decahydrate and disodium tetraborate pentahydrate as reprotoxic. As a result, it is necessary to comply with certain boundary conditions and to take certain precautionary measures during production using such raw materials.

Owing to the relatively high costs of boron-containing raw materials, the foreseeable shortage of suitable qualities and the current discussion relating to the reclassification of the toxicity of boron compounds, boron-free glasses are of interest as an alternative to the borosilicate glasses.

In addition to the very good chemical resistance, however, even further demands are imposed on neutral glasses.

By way of example, it has to be possible for the glass to be produced in conventional melting units, i.e. the viscosity of the melt cannot be excessively high—the working point (temperature at which the viscosity is $10^4$ dPas, also referred to as VA or T4) should by no means exceed the maximum value of 1320° C. For energy-saving production, T4 should be as low as possible.

Although the thermal expansion in the range of 20° C. to 300° C. is not especially important for use as primary pharmaceutical packaging material, a value of approximately $5.0 \cdot 10^{-6}$ K$^{-1}$ should nevertheless be targeted, in order to set a resistance to thermal shocks comparable to that of the known neutral glasses such as SCHOTT FIOLAX® 8412. In addition, glasses having this thermal expansion can also be used as so-called sealing glasses in electrical engineering, since some metals and alloys likewise lie in this expansion range and therefore stable glass/metal composites, e.g. leadthroughs, are possible. When using Fe—Ni—Co alloys, such as VACON®, having a coefficient of thermal expansion a in the range of 20° C. to 300° C. of $5.4 \cdot 10^{-6}$ K$^{-1}$, zirconium ($\alpha_{20/300} = 5.9 \cdot 10^{-6}$ K$^{-1}$) or zirconium alloys, glasses having a coefficient of expansion $\alpha_{20/300}$ of between 5 and $6 \cdot 10^{-6}$ K$^{-1}$ are required as sealing glasses for glass/metal seals.

Although a range of boron-free glasses are known in the prior art, these are substantially unsuitable as neutral glasses in the sense of the present definition.

WO 96/39362 discloses a glass for boron-free glass fibers, comprising 59 to 62% by weight SiO$_2$, 20 to 24% by weight CaO, 12 to 15% by weight Al$_2$O$_3$, 1 to 4% by weight MgO, 0 to 0.5% by weight F$_2$, 0.1 to 2% by weight Na$_2$O, 0 to 0.9% by weight TiO$_2$, 0 to 0.5% by weight Fe$_2$O$_3$, 0 to 2% by weight K$_2$O and 0 to 0.5% by weight SO$_3$.

Although a glass of this type is suitable for the production of continuous glass fibers, it does not satisfy the demands imposed on a neutral glass.

U.S. Pat. No. 5,508,237 discloses a flat glass display comprising an aluminosilicate glass which exhibits a weight loss of less than 2.5 mg/cm$^2$ after immersion for 24 hours in an aqueous 5% strength HCl solution at 95° C. The glass contains 49 to 67% by weight SiO$_2$ and at least 6% by weight Al$_2$O$_3$, where Al$_2$O$_3$ is 6 to 14% by weight in conjunction with 55 to 67% by weight SiO$_2$ and is 6 to 23% by weight in conjunction with 49 to 58% by weight SiO$_2$. The total content of SiO$_2$ and Al$_2$O$_3$ is greater than 68%. The glass further contains 0 to less than 8% by weight B$_2$O$_3$ and at least one alkaline earth metal oxide, specifically 0 to 21% by weight BaO, 0 to 15% by weight SrO, 0 to 7.1% by weight CaO, 0 to 8% by weight MgO, where the total content of BaO+CaO+SrO+MgO is 12 to 30% by weight.

The glass firstly does not have a sufficient acid resistance and secondly contains at least strontium oxide or barium oxide and possibly also boron oxide. It is therefore not suitable as boron-free neutral glass.

DE 10 2004 036 523 A1 discloses a glass substrate for a display which consists of a glass comprising 40 to 70% by weight SiO$_2$, 2 to 25% by weight Al$_2$O$_3$, 0 to 20% by weight B$_2$O$_3$, 0 to 10% by weight MgO, 0 to 15% by weight CaO, 0 to 10% by weight SrO, 0 to 30% by weight BaO, 0 to 10% by weight ZnO, 0 to 25% by weight R$_2$O (Li$_2$O, Na$_2$O, K$_2$O), 0.4% by weight As$_2$O$_3$, 0 to 3% by weight Sb$_2$O$_3$ and 0.01 to 1% by weight SnO$_2$. The glass is intended to be suitable for the production of flat glass using the downdraw method. In order to obtain a high acid resistance and a low coefficient of thermal expansion, the SiO$_2$ content is preferably 57 to 64% by weight. In order to make it possible for the glass to be produced using the downdraw method or using the rotary method, the redraw method or the like, the glass has to have a sufficient flowability, and for this reason preferably 5 to 15% by weight $B_2O_3$, particularly preferably 7.5 to 11% by weight $B_2O_3$, are added. The glass preferably further contains strontium oxide and barium oxide.

A glass of this type is therefore not suitable as boron-free neutral glass which, in addition to a high acid resistance, also has to have a high hydrolytic resistance and alkali resistance.

U.S. Pat. No. 5,854,153 discloses a glass substrate for an electronic display, wherein the glass contains 42 to 62% by weight $SiO_2$, 16.5 to 28% by weight $Al_2O_3$, 0 to 4% by weight $B_2O_3$, 3 to 10% by weight $Na_2O$, 1 to 11% by weight $K_2O$, 0 to 6% by weight MgO, 9.5 to 24% by weight CaO, 0.2 to 8% by weight SrO, 0 to 16% by weight BaO and 0 to 4% by weight $ZrO_2$ and has a total alkali metal content of 4 to 16% by weight.

Owing to the low $SiO_2$ content, a glass of this type does not have a sufficient chemical resistance.

Furthermore, EP 1 074 521 A2 discloses a boron-free glass composition for a filter medium, comprising 62 to 68 mol % $SiO_2$, 2 to 6 mol % $Al_2O_3$, 10 to 16 mol % $Na_2O$, 0 to 6 mol % $K_2O$, 0 to 6 mol % $Li_2O$, 3 to 10 mol % CaO, 0 to 8 mol % MgO, 0 to 3 mol % BaO, 2 to 6 mol % ZnO, 0 to 2 mol % $TiO_2$ and 0 to 2 mol % $F_2$, where the total alkali metal content is less than 18 mol %.

The glass is particularly suitable for the production of HEPA clean-room filters which consist of glass fibers. For this purpose, the glass has to have a relatively good acid resistance, although special emphasis is not placed on the hydrolytic resistance and the alkali resistance.

In practice, the known glass has an excessively low aluminium oxide content and an excessively high alkali metal content to be suitable as boron-free neutral glass.

WO 2008/143999 A1 discloses an alkali metal aluminosilicate glass comprising 64 to 68 mol % $SiO_2$, 12 to 16 mol % $Na_2O$, 8 to 12 mol % $Al_2O_3$, 0 to 3 mol % $B_2O_3$, 2 to 5 mol % $K_2O$, 4 to 6 mol % MgO and 0 to 5 mol % CaO. In this glass, the total content of $SiO_2+B_2O_3+$CaO is between 66 and 69 mol % and the total content of $Na_2O+K_2O+B_2O_3+$MgO+CaO+SrO is greater than 10 mol %. The total content of MgO+CaO+SrO is between 5 and 8 mol %. The difference resulting from the total content of $Na_2O+B_2O_3$ less the $Al_2O_3$ content should be greater than 2 mol %, and the difference of $Na_2O-Al_2O_3$ should be between 2 and 6 mol %. The difference resulting from the total content of $Na_2O+K_2O$ less the $Al_2O_3$ content should be between 4 and 10 mol %.

In practice, the glass has an excessively high content of sodium oxide and potassium oxide to be suitable as neutral glass.

SUMMARY OF THE INVENTION

In view of this it is a first object of the invention is to disclose a glass which is free of boron oxide, has a sufficient chemical resistance, such that it is ideally suitable as neutral glass.

It is a second object of the invention to disclose a glass free of boron oxide that has a good chemical resistance to be suitable as a neutral glass and that can be produced in conventional melting systems, preferably at relatively low melting temperatures.

According to the invention these and other objects are achieved by a glass containing at least the following constituents (in % by weight, based on oxide):

| | |
|---|---|
| $SiO_2$ | 65-72 |
| $Al_2O_3$ | 11-17 |
| $Na_2O$ | 0.1-8 |
| MgO | 3-8 |
| CaO | 4-12 |
| ZnO | 0-10, | wherein the weight ratio CaO/MgO is 1.4 to 1.8,
wherein no $B_2O_3$, SrO, BaO and PbO are present, apart from unavoidable impurities,
wherein a hydrolytic resistance in accordance with DIN ISO 719 in hydrolytic class 1 is obtained,
wherein an acid resistance in accordance with DIN 12116 at least in acid class 2 is obtained, and
wherein an alkali resistance in accordance with DIN ISO 695 at least in alkali class 2 is obtained.

The object of the invention is further achieved by a glass containing at least the following constituents (in % by weight, based on oxide):

| | |
|---|---|
| $SiO_2$ | 65-72 |
| $Al_2O_3$ | 11-17 |
| $Na_2O$ | 0-8 |
| $K_2O$ | 0-2 |
| MgO | 3-8 |
| CaO | 4-12 |
| ZnO | 0.1-10, | wherein the weight ratio CaO/MgO is 1.4 to 1.8,
wherein no $B_2O_3$, SrO, BaO and PbO are present, apart from unavoidable impurities,
wherein a hydrolytic resistance in accordance with DIN ISO 719 in hydrolytic class 1 is obtained,
wherein an acid resistance in accordance with DIN 12116 in acid class 1 is obtained, and
wherein an alkali resistance in accordance with DIN ISO 695 at least in alkali class 2 is obtained.

The object of the invention is achieved in full in this way.

In this context, "unavoidable impurity" is understood to mean an impurity as can arise unavoidably as a result of impure raw materials. Depending on the purity of the raw materials used, this is understood to mean an impurity of at most 1% by weight, in particular of at most 0.5% by weight and further particularly preferably 0.1% by weight.

The glasses according to the invention are boron-free, strontium-free and barium-free and have a high chemical resistance. The hydrolytic resistance is in class 1, whereas the alkali resistance and the acid resistance are in class 1 or 2.

The glasses according to the invention preferably have a working point T4 (temperature at which the glass melt has a viscosity of $10^4$ dPas) of less than 1320° C., further preferably of less than 1300° C., particularly preferably of less than 1260° C.

This affords good producibility with low energy costs.

Furthermore, the glasses according to the invention are distinguished by a good streak and bubble quality and a high devitrification stability.

Since the expensive raw materials borax, boric acid and magnesium carbonate are no longer used, the glasses according to the invention can be produced at a much lower cost than known neutral glasses based on borosilicate glasses.

The coefficient of thermal expansion $\alpha_{20/300}$ is in the preferred range of about $5 \cdot 10^{-6}$ $K^{-1}$.

The glasses according to the invention have a minimum $SiO_2$ content of 65% by weight, which is a prerequisite for a high acid resistance. If the maximum content of 72% by weight is exceeded, the working point rises to values above 1320° C., and the melt would thus be too tough to be producible economically in conventional melting units.

Aluminium oxide has a stabilizing effect and increases the chemical resistance by virtue of the fact that alkali metal and alkaline earth metal ions are incorporated permanently in the glass structure. The glass according to the invention has an aluminium oxide content of 11 to 17% by weight, preferably of 14 to 17% by weight, further preferably of 15 to 17% by weight. In the case of smaller contents, the tendency towards crystallization and the evaporation of gas components would accordingly increase at the high melting temperatures in the tank furnace. The disadvantageous effect of excessively high contents would be an increase in the processing and melting temperatures.

The addition of alkali metal oxides results in lower melting temperatures but also in an increase in the coefficient of thermal expansion, and therefore only relatively small amounts are used.

The $Na_2O$ content is preferably 0.5 to 8% by weight, further preferably 1 to 8% by weight, further preferably 2 to 8% by weight, particularly preferably 2 to 6% by weight.

The glasses according to the invention can contain 0 to 2% by weight, preferably 0.1 to 2% by weight, $Li_2O$.

As an alternative or in addition to $Na_2O$, it is also possible in principle to use the other two alkali metal oxides $Li_2O$ and $K_2O$, although $Na_2O$ is preferred for reasons of cost. In addition, $K_2O$-containing melts sometimes lead to increased corrosion of the tank blocks. Finally, all naturally occurring potassium-containing raw materials contain the radioactive isotope $^{40}K$, which is undesirable for some electrotechnical applications.

According to the invention, therefore, the $K_2O$ content is restricted to 0 to 2% by weight, if no $Na_2O$ is used, preferably to 0.1 to 2% by weight.

In order to increase the thermal expansion and reduce the viscosity of the melt (so-called flux), the glasses contain the two alkaline earth metal oxides MgO and CaO. Glasses which are particularly chemically resistant and stable against devitrification are obtained if the ratio of CaO to MgO (based on % by weight) is between 1.4 and 1.8. Expressed in molar fractions, the ratio of CaO to MgO should be 1.0 to 1.6. If the (weight) ratio CaO/MgO is greater than 1.4, it is possible to use the inexpensive raw materials dolomite and limestone, without it being necessary to additionally use the expensive raw material $MgCO_3$ (or even more expensive magnesium-containing raw materials). Since MgO reduces T4 much more effectively than CaO, the ratio CaO/MgO should not exceed the value of 1.8.

The CaO content is preferably 7.1 to 12% by weight, further preferably 8 to 12% by weight, particularly preferably 8 to 11% by weight.

The alkaline earth metal oxides SrO and BaO are preferably not added, since these components are not entirely toxicologically harmless and, particularly when the glass is used as primary pharmaceutical packaging material, cloudy precipitations can occur with solutions of some specific, usually sulphur-containing, active substances (sulphates, sulphones and the like).

Lead oxide PbO is preferably not used for toxicological reasons.

The ZnO content can preferably be 3 to 4% by weight. Further preferred ranges are 4 to 10% by weight and 6 to 10% by weight.

The addition of zinc oxide ZnO acts as a flux. Up to 10% by weight, preferably at least 0.1% by weight, ZnO can be present in the glass. A disadvantage associated with the use of this component is the tendency towards evaporation with subsequent condensation of the evaporation products, which, particularly in the float method, can lead to undesirable glass defects on the surface of the glass particles.

The glasses according to the invention can further contain 0 to 10% by weight, preferably 1 to 10% by weight, $TiO_2$.

Additions of titanium oxide $TiO_2$ can improve the hydrolytic resistance of the glasses and always bring about increased absorption of UV radiation. However, this component also results in increased batch prices and is undesirable as a glass component in some applications. In addition, the formation of a brown colour is often observed, and this has a disruptive effect for some applications. This colouring becomes more and more pronounced as the amount of iron oxide entrained in the glass via the raw materials or the reuse of cullet increases. Depending on the application, titanium oxide is not used at all.

The glasses according to the invention can further contain 0.0 to 10% by weight, if appropriate 1 to 10% by weight, $ZrO_2$.

The addition of zirconium oxide greatly improves the alkali resistance of the glasses, although this is not of particularly great relevance for most applications. It is also possible not to use zirconium oxide at all, since its use increases the batch costs, impairs the melting behaviour of the batch particularly in compositions containing small amounts of alkali metals and increases the viscosity of the melt, and it is undesirable as a heavy metal in some applications.

Even if bubble-free and streak-free glasses are obtained on a laboratory scale without the addition of refining agents, the glasses according to the invention can contain 0.01 to 2% by weight, preferably 0.1 to 1.5% by weight, refining agents for large-scale production.

In total, up to 1.5% by weight $As_2O_3$, $Sb_2O_3$, $SnO_2$, $CeO_2$, $MnO_2$, $Fe_2O_3$, $Cl^-$ (e.g. as NaCl or $ZnCl_2$), $F^-$ (e.g. as $CaF_2$ or $MgF_2$) and/or sulphate (e.g. as $Na_2SO_4$ or $ZnSO_4$) can be added as refining agent.

The addition of fluoride reduces the viscosity of the melt, and this accelerates the refining. For reasons of environmental protection, the addition of $As_2O_3$ or $Sb_2O_3$ should ideally be avoided.

The addition of chlorides or fluorides as refining agent tends to impair the acid resistance of the glass. Furthermore, the addition of chlorides in neutral glasses can have the effect that chloride evaporates upon each heating operation and then condenses on the glass products. Although the addition of fluorides reduces the working point T4, this also slightly impairs the acid resistance. Evaporation and condensation phenomena can also appear as a result of the addition of chloride. Finally, the stability of the tank furnace can be impaired by fluoride additions.

For this reason, the amount of chloride and fluoride added as refining agent is restricted to at most 1.5% by weight chloride or fluoride.

The glasses according to the invention are suitable as boron-free neutral glasses, which can completely replace conventional boron-containing neutral glasses.

Preferred uses of the glasses according to the invention are:
- as primary pharmaceutical packaging material, in particular as a bottle, syringe or ampoule,
- as laboratory glass and as chemical glass,
- as sealing glass, in particular as sealing glass for Fe—Co—Ni alloys,
- as a substrate, superstrate or covers, in particular for electrotechnical applications, for TFT, PWP and OLED screens and for photovoltaics, as tubing glass, in particular for lamps, halogen lamps or fluorescent tubes or for solar-thermal applications, as reflector glass, in particular for lamps, and as architectural glass, as thermal-shock-resistant glasses, in particular for parts of baking ovens, refrigerators or cookers.

It goes without saying that the features of the invention mentioned above and those still to be explained below can be used not only in the combination given in each case, but also in other combinations or on their own, without departing from the scope of the invention.

Further advantages and features of the invention will emerge from the following description of preferred exemplary embodiments.

DETAILED DESCRIPTION OF THE PREFERRED EMBODIMENTS

In the following, preferred examples of the invention are described in detail.

Examples

Table 2 summarizes the composition in % by weight of various glasses according to the invention as Examples B1 to B3. The glasses B4, B5 have a similar composition, but are no longer in acid class 1.

TABLE 2

| Constituent (% by weight) | B1 | B2 | B3 | B4 | B5 | B6 |
|---|---|---|---|---|---|---|
| $SiO_2$ | 66.0 | 69.0 | 71.2 | 65.8 | 66.0 | 68.0 |
| $Al_2O_3$ | 14.5 | 16.0 | 12.0 | 14.3 | 14.5 | 12.2 |
| $Na_2O$ | 4.0 | 7.2 | 5.0 | 4.0 | 4.0 | 4.0 |
| MgO | 6.5 | 3.2 | 3.2 | 5.6 | 6.5 | 6.5 |
| CaO | 9.0 | 4.6 | 4.6 | 9.3 | 9.0 | 9.0 |
| ZnO | | | | 4.0 | | |
| $SnO_2$ | | | | | | 0.3 |
| F | | | | 1.0 | | |
| $\alpha_{20/300}$ | 5.18 | 5.57 | 4.80 | 5.08 | 4.97 | 2.51 |
| Density | 2.5116 | 2.4344 | 2.4722 | 2.5091 | 2.5128 | 2.5091 |
| Tg | 705 | 696 | 688 | 672 | 712 | 703 |
| T7.6 | 921 | 963 | 958 | 906 | 931 | 920 |
| T4 | 1241 | 1362 | 1348 | 1239 | 1250 | 1249 |
| H | 16 | 21 | 013 | 22 | 26 | 18 |
| S | 0.6 | 0.6 | 0.5 | 0.9 | 0.8 | 0.5 |
| L | 74 | 69 | 67 | 80 | 79 | 67 |

Furthermore, the following properties are given: $\alpha_{20/300}$ in $10^{-6}$/K, the glass transformation temperature Tg in °C., the softening point T7.6 in °C. and the working point T4 in °C. The hydrolytic resistance H is given as base-equivalent acid consumption in mg $Na_2O$/g glass grit, the acid resistance of the material removal value S after acid attack is given in mg/dm$^2$ and the alkali resistance L in the form of the material removal value upon alkali attack is given in mg/dm$^2$.

Table 3 shows the glass compositions of glasses B1 to B5 in mol %.

TABLE 3

| Constituent (mol %) | B1 | B2 | B3 | B4 | B5 | B6 |
|---|---|---|---|---|---|---|
| $SiO_2$ | 67.5 | 72.5 | 74.3 | 66.1 | 67.5 | 69.0 |
| $Al_2O_3$ | 8.7 | 9.9 | 7.4 | 8.5 | 8.7 | 7.3 |
| $Na_2O$ | 4.0 | 7.3 | 5.1 | 3.9 | 4.0 | 3.9 |
| MgO | 9.9 | 5.0 | 5.0 | 8.4 | 9.9 | 9.8 |
| CaO | 9.9 | 5.2 | 5.1 | 10.0 | 9.9 | 9.8 |
| ZnO | | | 3.1 | | | |
| $SnO_2$ | | | | | | 0.1 |
| F | | | | | 3.2 | |

The glasses were melted by melting conventional raw materials in an inductively heated Pt/Rh crucible (Pt20Rh) at 1650° C. The melting operation lasted for three to four hours. For homogenization, the melt was then stirred for one hour at 1600° C. and then left to stand at this temperature for two hours without stirring, in order to allow any bubbles present to rise to the surface. The melt was cooled at a defined cooling rate of 30 K/h.

In order to test the devitrification, the glass B1 was melted for thirty minutes at 1500° C. and heat-conditioned for five hours in a gradient furnace. No defined devitrification was observed in the temperature range of 1150° C. to 1423° C.

The glasses B1, B2, B3 and B5 all have a hydrolytic resistance in class 1. The acid resistance of the glasses B1 to B3 is also in class 1, as is the alkali resistance.

However, the glasses B2, B3 have a relatively high working point, and this makes it harder to produce these glasses economically.

In terms of composition, the glass B5 corresponds to the glass B1, although in the case of B5 1% $Na_2O$ was introduced as refining agent in the form of sodium chloride, NaCl. B5 and B1 have a similarly good bubble quality, so far as this can be perceived when the glass is produced as laboratory glass.

However, the acid resistance is impaired somewhat by the addition of chloride and is already in acid class 2. However, the use of chlorides can also be problematic because evaporations of chlorides with subsequent condensation on the glass particles can occur upon reheating. This phenomenon is known under the term "lamp rings", e.g. when cutting tubes to length (before the production of lamps). The addition of chlorides should therefore be kept as low as possible.

Alternatively, however, it is also possible to use other known refining methods, e.g. sulphate refining and high-temperature boosting. Compared to the glass B1, the glass B4 shows that the addition of fluorides makes it possible to lower both the softening point T7.6 and the working point T4. The acid resistance is impaired slightly, and is already in acid resistance class 2.

The use of fluorides, similarly to the use of chlorides, can lead to evaporation and condensation phenomena owing to the high volatility during hot moulding and may possibly reduce the stability of the tank furnace. Owing to the action of aqueous or other solutions, fluorides can also be transferred from the glass into the liquid, where they bring about undesirable reactions with the ingredients.

The fluoride content should therefore be kept as low as possible and the upper limit of 1.5% by weight should not be exceeded.

Table 4 shows V1 to V4 as comparative examples, which have compositions known in the literature and have been melted on a laboratory scale.

V1 is taken from Salama S. N., Salman S. M. and Gharid S., J. Non-Cryst. Solids, 1987, Vol. 93, No. 1, page 203. V2 is taken from Zdaniewski W., J. Am. Ceram. Soc., 1975, Vol. 58, No. 5-6, page 163. V3 is Example 2 from U.S. Pat. No. 5,508,237. V4 is Example 6 from U.S. Pat. No. 5,508,237.

The glasses were melted by melting conventional raw materials in an inductively heated Pt/Rh crucible (Pt20Rh) at 1650° C. The melting operation lasted for three to four hours. For homogenization, the melt was then stirred for one hour at 1600° C. and then left to stand at this temperature for two hours without stirring, in order to allow any bubbles present to rise to the surface. The melt was cooled at a defined cooling rate of 30 K/h. The other properties are given in the same units as in Table 2.

TABLE 4

| Constituent (% by weight) | V1 | V2 | V3 | V4 |
|---|---|---|---|---|
| $SiO_2$ | 60.68 | 59.83 | 65.90 | 65.70 |
| $Al_2O_3$ | 28.08 | 17.09 | 13.00 | 8.00 |
| $Li_2O$ | 2.74 | | | |
| MgO | 8.50 | 8.55 | | |
| CaO | | | | 5.70 |
| SrO | | | 0.40 | 12.90 |
| BaO | | | 20.70 | 7.70 |
| $TiO_2$ | | 5.98 | | |
| $CeO_2$ | | 8.55 | | |
| $\alpha_{20/300}$ | 3.92 | 3.33 | | 5.00 |
| Density | 2.4934 | 2.6557 | | 2.7337 |
| Tg | 721 | 762 | | 757 |
| T7.6 | devitrified | devitrified | | 989 |
| T4 | 1228 | 1259 | | 1323 |
| H | 14 | 12 | | 13 |
| S | 31 | 116 | | 0.6 |
| L | 115 | 142 | | 91 |

V1 and V2 are very stable against attack by water but are a far cry from the aim of acid class 1 (weight loss up to 0.7 mg/dm$^2$) or of acid class 2 (weight loss up to 1.5 mg/dm$^2$). The melt of V3 was very tough, and for this reason no suitable glass block could be cast. V4 is a glass which is free of boron oxide and has a hydrolytic and acid resistance in class 1 and an alkali resistance in class 2. However, the working point T4, at above 1320° C., is too high for economic production in commercial melting units. In addition, high SrO and BaO contents are undesirable for neutral glasses, since there is the risk of precipitations with sulphur-containing medicaments (sulphones, sulphates and the like).

Table 5 shows further Comparative Examples G1 to G17 of aluminosilicate glasses, with the composition in % by weight.

TABLE 5

| | G1 | G2 | G3 | G4 | G5 | G6 |
|---|---|---|---|---|---|---|
| $SiO_2$ | 60.2 | 59.2 | 60.2 | 59.2 | 59.2 | 63.2 |
| $Al_2O_3$ | 19.0 | 19.0 | 19.0 | 19.0 | 19.0 | 20.0 |
| $Na_2O$ | | 3.0 | | 3.0 | 3.0 | |
| $K_2O$ | | | | | | |
| MgO | 2.8 | 2.8 | 2.8 | 2.8 | 6.2 | 6.0 |
| CaO | 14.0 | 12.0 | 14.0 | 12.0 | 8.6 | 6.8 |
| ZnO | | | | | | |
| $TiO_2$ | 4.0 | 4.0 | | | | 4.0 |
| $ZrO_2$ at a viscosity of the glass melt of $10^4$ dPas | | | 4.0 | 4.0 | 4.0 | |
| $\alpha_{20/300}$ | 4.60 | 5.1 | 4.51 | 4.95 | 4.73 | 3.56 |
| Density | 2.6056 | 2.5811 | 2.6387 | 2.6089 | 2.6083 | 2.5420 |
| Tg | 764 | 722 | 786 | 745 | 743 | 761 |
| T7.6 | 952 | 917 | 983 | 954 | 944 | 979 |
| T4 | 1229 | 1214 | 1255 | 1251 | 1226 | 1274 |
| H | 9 | 11 | 15 | 20 | 24 | 11 |
| S | 3.9 | 9.5 | 3.3 | 7.0 | 7.4 | 3.7 |
| L | 92 | 85 | 51 | 50 | 50 | 97 |

| | G7 | G8 | G9 | G10 | G11 | G12 |
|---|---|---|---|---|---|---|
| $SiO_2$ | 65.0 | 64.00 | 65.0 | 64.0 | 64.0 | 63.0 |
| $Al_2O_3$ | 17.5 | 17.50 | 17.5 | 17.5 | 17.5 | 17.2 |
| $Na_2O$ | | 3.00 | | 3.0 | 3.0 | |
| $K_2O$ | | | | | | |
| MgO | 8.3 | 6.30 | 8.3 | 6.3 | 4.9 | 9.0 |
| CaO | 5.4 | 5.40 | 5.4 | 5.4 | 6.8 | 4.0 |
| ZnO | | | | | | |
| $TiO_2$ | 3.8 | 1.9 | | | 1.9 | |
| $ZrO_2$ | | 1.9 | 3.8 | 3.8 | 1.9 | 6.8 |

TABLE 5-continued

| | | | | | | |
|---|---|---|---|---|---|---|
| $\alpha_{20/300}$ | 3.62 | 4.28 | 3.48 | 4.25 | 4.40 | 3.45 |
| Density | 2.5346 | 2.5295 | 2.5593 | 2.5436 | 2.5328 | 2.6073 |
| Tg | 756 | 735 | 791 | 751 | 731 | 796 |
| T7.6 | 973 | 954 | 1003 | 973 | 958 | 1003 |
| T4 | 1269 | 1280 | 1298 | 1296 | 1284 | 1316 |
| H | 11 | 8 | 7 | 12 | 13 | 13 |
| S | 2.3 | 1.9 | 1.4 | 1.3 | 2.0 | 4.1 |
| L | 88 | 59 | 51 | 47 | 52 | 42 |

| | G13 | G14 | G15 | G16 | G17 |
|---|---|---|---|---|---|
| $SiO_2$ | 60.0 | 62.0 | 58.0 | 72.0 | 63.0 |
| $Al_2O_3$ | 16.5 | 16.2 | 16.5 | 5.0 | 19.0 |
| $Na_2O$ | 5.0 | | 5.0 | 7.0 | 6.0 |
| $K_2O$ | | | | 7.0 | |
| MgO | 6.3 | 9.0 | 6.3 | 3.7 | 6.5 |
| CaO | 5.4 | 4.0 | 5.4 | 5.3 | 5.5 |
| ZnO | | | | | |
| $TiO_2$ | | | | | |
| $ZrO_2$ | 6.8 | 8.8 | 8.8 | | |
| $\alpha_{20/300}$ | 5.08 | 3.52 | 5.16 | 8.03 | 5.36 |
| Density | 2.6109 | 2.6408 | 2.6495 | 2.4402 | 2.5028 |
| Tg | 732 | 793 | 734 | 568 | 702 |
| T7.6 | 942 | 1021 | 938 | 802 | 929 |
| T4 | 1265 | 1331 | 1269 | 1173 | 1262 |
| H | 14 | 12 | 15 | 41 | 16 |
| S | 3.1 | 15.6 | 7.0 | 0.4 | 3.7 |
| L | 33 | 36 | 34 | 66 | 82 |

Some of these glasses contain relatively large proportions of $TiO_2$ and/or $ZrO_2$ because these are known to have a positive effect on the glass resistance of other glasses. The examples show that hydrolytically stable glasses can be obtained in this way, in particular if the component $TiO_2$ is present in relatively large proportions. It is also possible to obtain glasses having an alkali resistance in class 1, particularly if the component $ZrO_2$ is present in relatively large proportions. However, the glasses with these components, irrespective of whether they are present individually or together, do not reach the required acid class 1.

As can be seen from the glasses B1 to B3 according to the invention, as shown in Table 2, additions of $TiO_2$ or $ZrO_2$ are also not necessary at all. Relatively small additions may have a positive effect, however.

What is claimed is:

1. A glass containing at least the following constituents (in % by weight, based on oxide):

| | |
|---|---|
| $SiO_2$ | 65-72 |
| $Al_2O_3$ | 11-17 |
| $Na_2O$ | 0.1-8 |
| MgO | 3-8 |
| CaO | 4.2-12 |
| ZnO | 0-10, | wherein the weight ratio CaO/MgO is 1.4 to 1.8;
wherein no $B_2O_3$, SrO, BaO, $ZrO_2$ and PbO are present, apart from unavoidable impurities;
wherein the glass is free of $Li_2O$ and $K_2O$, apart from unavoidable impurities;
which has a hydrolytic resistance in hydrolytic class 1 in accordance with DIN ISO 719;
which has an acid resistance at least in acid class 2 in accordance with DIN 12116; and
which has an alkali resistance at least in alkali class 2 in accordance with DIN ISO 695.

2. A glass containing at least the following constituents (in % by weight, based on oxide):

| | |
|---|---|
| $SiO_2$ | 65-72 |
| $Al_2O_3$ | 11-17 |
| $Na_2O$ | 0-8 |
| MgO | 3-8 |
| CaO | 4.2-12 |
| ZnO | 0.1-10, | wherein the weight ratio CaO/MgO is 1.4 to 1.8;
wherein the glass is free of $Li_2O$ and $K_2O$, apart from unavoidable impurities;
wherein no $B_2O_3$, SrO, BaO, $ZrO_2$ and PbO are present, apart from unavoidable impurities;
which has a hydrolytic resistance in hydrolytic class 1 in accordance with DIN ISO 719;
which has an acid resistance in acid class 1 in accordance with DIN 12116; and
which has an alkali resistance at least in alkali class 2 in accordance with DIN ISO 695.

3. The glass according to claim 1, wherein the $Na_2O$ content is 0.5 to 8% by weight.

4. The glass according to claim 1, wherein the $Na_2O$ content is 2 to 6% by weight.

5. The glass according to claim 1, wherein the CaO content is 7.1 to 12% by weight.

6. The glass according to claim 1, wherein the ZnO content is 3 to 10% by weight.

7. The glass according to claim 1, wherein the $Al_2O_3$ content is 14 to 17% by weight.

8. The glass according to claim 1, which has a working point T4 of less than 1320° C.

9. The glass according to claim 1, which further contains 1 to 10% by weight of $TiO_2$.

10. The glass according to claim 1, which further contains 0.01 to 2% by weight of refining agents.

11. The glass according to claim 1, which contains 0.01 to 2% by weight of at least one refining agent selected from the group consisting of $As_2O_3$, $Sb_2O_3$, $SnO_2$, $CeO_2$, $Cl^-$, $F^-$ and $SO_4^{2-}$.

12. The glass according to claim 1, which contains 0.01 to 2% by weight of at least one refining agent selected from the group consisting of $As_2O_3$, $Sb_2O_3$, $SnO_2$, $CeO_2$, $Cl^-$, $F^-$ and $SO_4^{2-}$, wherein the maximum content of each of $As_2O_3$, $Sb_2O_3$, $Cl^-$, $F^-$ and $SO_4^{2-}$ is 1.5% by weight.

13. The glass according to claim 1, which contains 0.01 to 2% by weight of at least one refining agent selected from the group consisting of $As_2O_3$, $Sb_2O_3$, $SnO_2$, $CeO_2$, $Cl^-$, $F^-$ and $SO_4^{2-}$, wherein the maximum content of each of $As_2O_3$, $Sb_2O_3$, $Cl^-$, $F^-$ and $SO_4^{2-}$ is 1.5% by weight, and wherein the maximum content of each of $SnO_2$ and $CeO_2$ is 1% by weight.

14. A glass containing at least the following constituents (in % by weight, based on oxide):

| | |
|---|---|
| $SiO_2$ | 65-72 |
| $Al_2O_3$ | 11-17 |
| $Na_2O$ | 0.5-8 |
| MgO | 3-8 |
| CaO | 4.2-12 |
| ZnO | 0-10, |
| F | 0-2, | wherein the weight ratio CaO/MgO is 1.4 to 1.8;
wherein no $B_2O_3$, SrO, BaO, $ZrO_2$ and PbO are present, apart from unavoidable impurities;
wherein the glass is free of $Li_2O$ and $K_2O$, apart from unavoidable impurities;
which has a hydrolytic resistance in hydrolytic class 1 in accordance with DIN ISO 719;
which has an acid resistance at least in acid class 2 in accordance with DIN 12116; and
which has an alkali resistance at least in alkali class 2 in accordance with DIN ISO 695.

15. The glass according to claim 14, wherein the ZnO content is 3 to 10% by weight.

16. The glass according to claim 14, wherein the $Al_2O_3$ content is 14 to 17% by weight, and wherein the $Na_2O$ content is 2 to 8% by weight.

17. The glass according to claim 14, which has a working point T4 of less than 1300° C.

* * * * *